W. H. ALLEN.
WAGON SEAT CONNECTION.
APPLICATION FILED JULY 26, 1916. RENEWED JAN. 11, 1918.

1,275,825.

Patented Aug. 13, 1918.

Witnesses
Philip E. Barnes
E. J. Sheely

Inventor
W. H. Allen
by James J. Sheely Co.
Attys.

UNITED STATES PATENT OFFICE.

WATSON H. ALLEN, OF MARSEILLES, ILLINOIS, ASSIGNOR OF ONE-HALF TO BENJAMIN E. HEPNER, OF MARSEILLES, ILLINOIS.

WAGON-SEAT CONNECTION.

1,275,825.

Specification of Letters Patent. Patented Aug. 13, 1918.

Application filed July 26, 1916, Serial No. 111,423. Renewed January 11, 1918. Serial No. 211,457.

*To all whom it may concern:*

Be it known that I, WATSON H. ALLEN, a citizen of the United States, residing at Marseilles, in the county of La Salle and State of Illinois, have invented new and useful Improvements in Wagon-Seat Connections, of which the following is a specification.

My present invention pertains to means for connecting the seats of wagons with the bodies thereof; and it contemplates the provision of a simple and strong connection calculated to preclude sliding of the seat lengthwise of the body when the wagon is ascending or descending grades or when the wagon or wagon body is inclined for dumping, as hereinafter described and claimed.

In the accompanying drawings which are hereby made a part hereof:

Similar numerals designate corresponding parts in both views of the drawings, referring to which.

Figure 1:
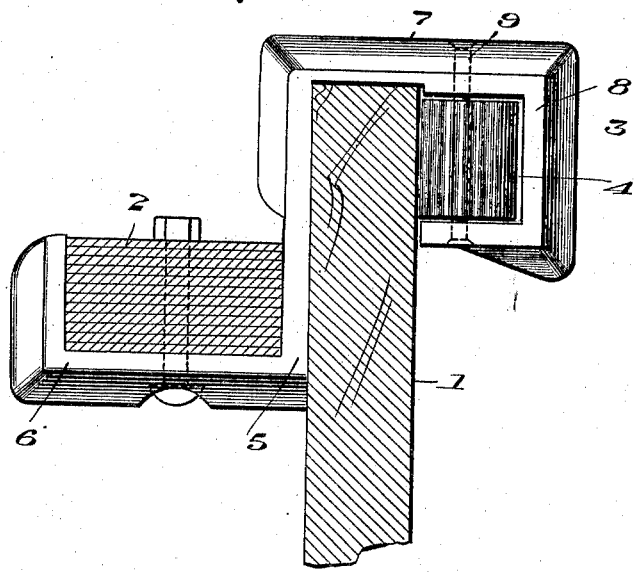
Figure 1 is a view in transverse section showing the arrangement of my connection relative to the side wall of a wagon body and the spring bar of a seat.
Figure 2:
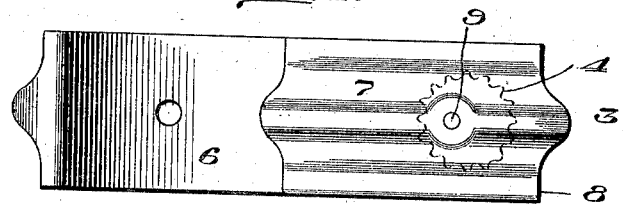
Fig. 2 is a plan of my novel invention *per se*.

1 is the side wall of a wagon body, and 2 is the spring bar complementary to a driver's seat.

My novel connection comprises a metallic clip 3 constructed and arranged to straddle the wall 1 and serve for the connection of the bar 2, and a cam roller 4.

Specifically the clip comprises an upright portion 5 for arrangement close against the inner side of the wall 1, an arm 6 reaching laterally inward from the upright portion 5 and then upwardly and designed to receive and be connected to the spring-bar 2, and an arm 7 reaching outwardly from the upright portion 5 and terminating in a U-shaped portion 8 that is open at its side toward the outer side of the wall 1. The arm 7 rests on the upper edge of the wall 1 and serves to support the connection.

Eccentrically mounted on the pintle 9 and disposed in the U-shaped clip portion 8 is the cam roller 4, before mentioned as comprised in the connection. It will be noted that the perimeter of the said roller is corrugated and is opposed to the outer side of the wall 1, and that consequently the said roller by engaging the wall 1 will preclude casual movement of the seat connection lengthwise of the wagon body. In this connection it will be noticed that by reason of the pivotal connection of the cam roller being disposed at right angles to the length of the wall 1, the cam roller will grip the side of said wall 1 as soon as the seat commences to slide in the direction of the length of the wall. When, however, it is desired for any reason to shift the seat connection lengthwise of the body, the same may be expeditiously and easily accomplished after the cam roller is turned on the pintle to carry its larger portion away from the side wall of the body.

It will be gathered from the foregoing that my novel seat connection while efficient for the purpose stated, is simple and inexpensive in construction and is susceptible of ready application without the employment of skilled labor.

Having described my invention, what I claim and desire to secure by Letters-Patent, is:

1. The combination of the side wall of a wagon body, a body constructed and arranged to rest on and at either side of said side wall and adapted at one side of the wall for connection with a seat; the said body being movable or adjustable on the said side of the wall in the direction of the length of the wall, a seat portion connected to the body at the side stated, and an upright cam roller mounted in the portion of the body at the opposite side of the side wall, in position for its perimeter to engage said side wall; the pivot of the said cam roller being disposed at right angles to the length of the side wall of the body; and the cam roller being therefore adapted to automatically engage and hold the body in the event of the latter tending to casually slide in the direction of the length of the side wall of the wagon body.

2. A seat connection comprising a clip adapted to straddle the side wall of a wagon body and having a U-shaped portion at the inner side of the said side wall for connection with a seat and also having a U-shaped portion at the outer side of the side wall and open toward the latter, and an upright corrugated cam roller mounted in the last-named U-shaped portion and having its perimeter opposed to the said side wall and disposed at right angles to the length thereof.

In testimony whereof I have hereunto set my hand in presence of two subscribing witnesses.

WATSON H. ALLEN.

Witnesses:
BENJAMIN E. HEPNER,
ROY WERNSTRUM.